Nov. 20, 1923.
L. J. LIDDELL
AUTOMOBILE LIFTER
Filed July 7, 1921
1,474,419
2 Sheets-Sheet 2
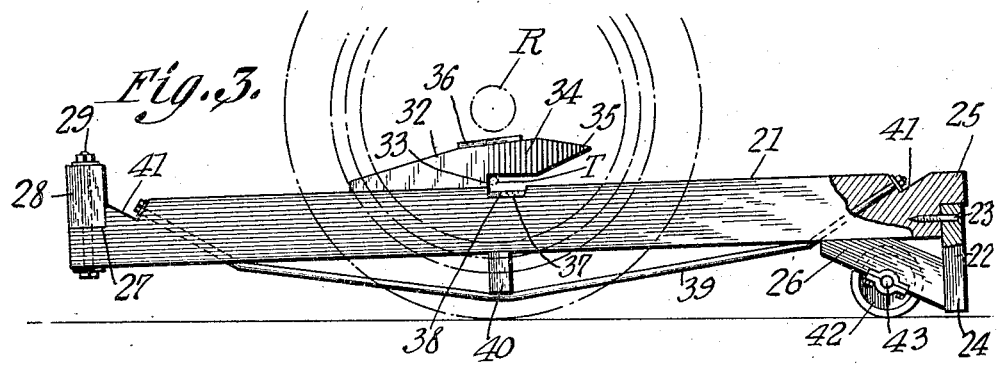
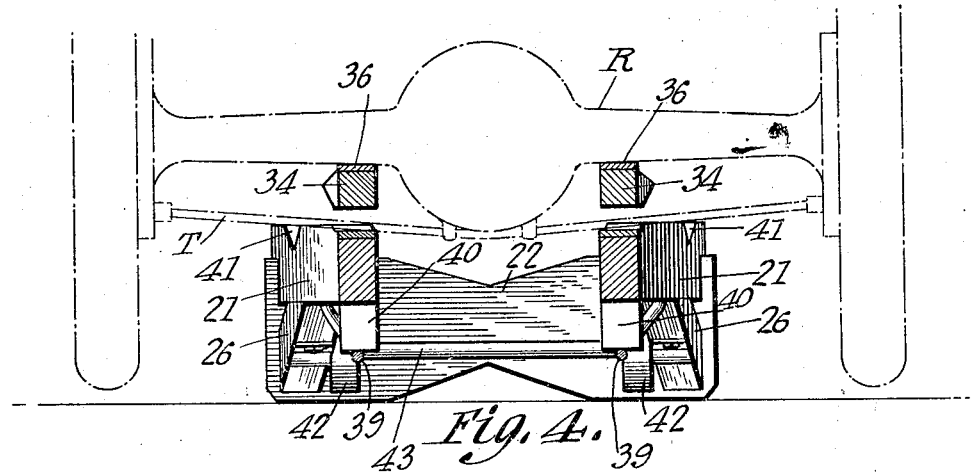
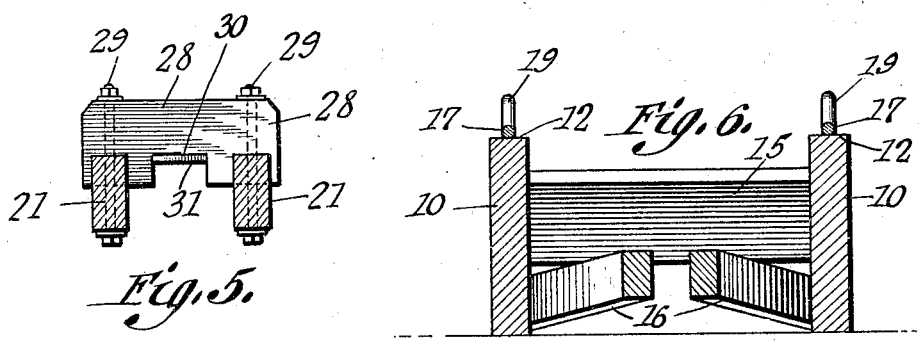
Inventor
Louise Jordan Liddell
By John R. Tomlin
Attorney Patented Nov. 20, 1923.

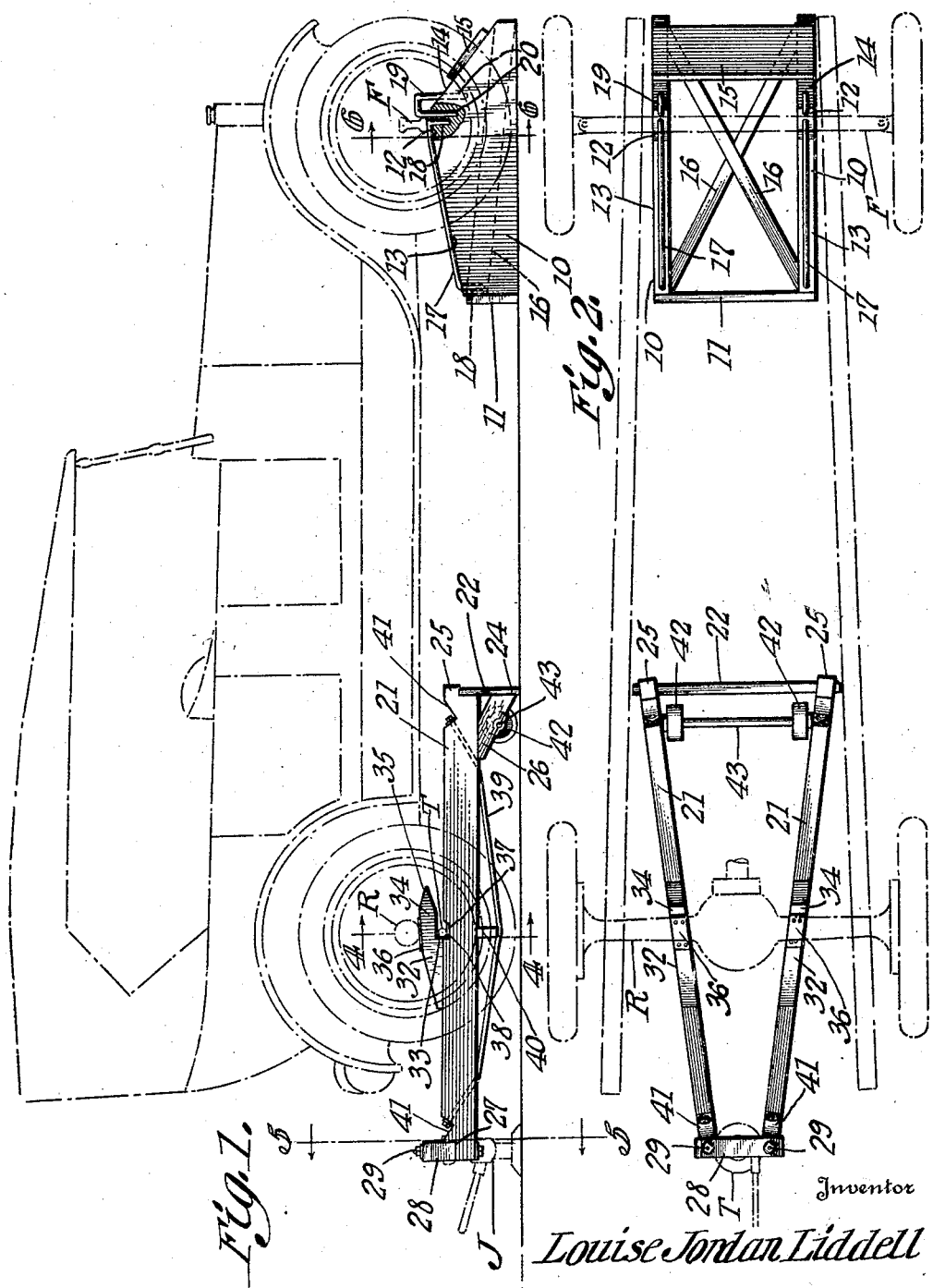

1,474,419

UNITED STATES PATENT OFFICE.

LOUISE JORDAN LIDDELL, OF NEW ORLEANS, LOUISIANA.

AUTOMOBILE LIFTER.

Application filed July 7, 1921. Serial No. 483,104.

*To all whom it may concern:*

Be it known that I, LOUISE JORDAN LIDDELL, a citizen of the United States, residing at New Orleans, in the parish of Orleans and State of Louisiana, have invented a new and useful Automobile Lifter, of which the following is a specification.

This invention relates to vehicle lifters and more particularly to lifting jacks adapted for use in connection with automobiles.

An object of this invention is to provide means for conveniently lifting the body of an automobile so that its pneumatic tires will not engage the ground or supporting floor, thereby relieving the tires of the stress occasioned by the weight of the automobile while it is idle in the garage or other inclosure.

Another object of this invention is to provide a portable automobile lifter having its components so arranged that they can be readily and quickly brought into cooperable relation with the front and rear axles of the conventional automobile.

A further object of this invention is to provide an automobile lifting device of generally improved construction, whereby the device will be simple, durable and inexpensive in construction, as well as convenient, practical, efficient and serviceable in its use.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

The invention has been illustrated in its preferred embodiments in the accompanying drawings, wherein:

Figure 1 is a side elevation of the device showing it supporting an automobile, the automobile being shown in dotted lines;

Figure 2 is a top plan view of the device, showing a portion of the automobile in dotted lines;

Figure 3 is an enlarged side elevation of the rear lifting device, showing it in its lowered positions;

Figure 4 is a transverse sectional view taken on a line 4—4 of Figure 1, the rear axle of the automobile being shown in dotted lines;

Figure 5 is a transverse sectional view taken on a line 5—5 of Figure 1; and

Figure 6 is a transverse sectional view taken on a line 6—6 of Figure 1.

Referring to the drawings there is shown a forward lifting or elevating device comprising opposed parallel side members 10, which are united at their rear ends by a vertically disposed cross strip 11. The upper edge of each side member 10 has an approximately horizontal intermediate portion 12, and rearwardly and forwardly inclined portions 13 and 14, the forward terminals of the side members 10 being united by an obliquely disposed cross strip or board 15, and these side members are further secured in fixed relation to each other by diagonally disposed brace bars 16.

A track or slide member 17 overlies and rests against the forwardly inclined edge 13 of each side member 10, and these tracks 17 are preferably formed of rod iron or steel so that they will offer an anti-friction and wear-resisting surface for the front axle F of the automobile to slide upon. These tracks are rigidly secured to the side members 10 by inwardly bending their opposed terminals 18 and driving them into the side members 10, which side members are preferably formed of a good grade wood.

In order to limit the forward sliding movement of the front axle F of the automobile relative to the side members 10, stop members or staples 19, which have their opposed terminals 20 let into the side members 10 and their intermediate portions extending upwardly beyond the upper edge 12 of the side members 10, are provided to engage the front axle and thereby limit the forward sliding movement of the axle upon the tracks 17.

A rear lifting device is provided in the form of a composite lever and includes opposed obliquely disposed side rails or lever bars 21, which are preferably formed of wood and are united at their forward terminals by a cross member 22 which is secured to the lever bars by screws or other securing devices 23. This cross member is relatively broad so that it extends downwardly beyond the lower edges of the lever bars 21 to thereby form a fulcrum foot or member 24. The forward ends of the lever bars 21 are rabbeted to provide forwardly extending lugs 25 which overlie and engage the upper edge of the cross member or board 22 to thereby relieve the securing devices 23 of the direct supporting stress when lifting an automobile; and the fulcrum foot 24 is reinforced by obliquely disposed braces 26, which extend between and are secured to the lower edges of the lever bars 21 and the rear face of the fulcrum foot 24.

Each lever bar 21 has its rear end rabbeted as shown at 27, to receive the opposed terminals of a jack rest or cross block 28 which unites the rear terminals of the lever bars 21 and is secured to them by means of bolts or other securing devices 29. Since the lever bars 21 converge rearwardly the jack rest 28 is made relatively short and consequently strong, and the intermediate lower portion of the jack rest 28 is cut away to form a recess 30 which has a metallic wear plate 31 secured therein to engage the lifting head of the ordinary lifting jack J.

Opposed rest blocks 32 are secured to the upper edges of the intermediate portions of the lever bars 21 and these blocks are cut away to provide stop-shoulders 33 and overhanging portions 34 having their forward terminals tapered, as shown at 35.

A metallic wear plate 36 is secured to the upper edge of each rest block 32 to engage the rear axle R of the automobile, thus reinforcing these blocks and preventing the rear axle from mutilating them. Recesses 37 are formed in the upper edges of the lever bars 21, immediately below the overhanging portions 34 of each rest block 32, and these recesses receive wear plates 38 which are adapted to engage the rear axle truss rod T to thereby protect the lever bars.

In order to reinforce the lever bars 21 they are each provided with a brace in the form of a truss rod 39 which is spaced from the intermediate portion of the lever bar 21 by means of a spacing block or strut 40, and the opposed terminals of each truss rod 39 extends obliquely through the end portions of the lever bar. The opposed ends of each truss rod 39 are threaded for the reception of nuts or other securing devices, which engage the inclined inner walls of notches 41 formed in the upper edges of the lever bars 21 adjacent the opposed terminals thereof, thereby rigidly securing the truss rods 39 to the lever bars 21.

To permit the rear lifting device to be freely and conveniently moved along the floor or supporting surface, wheels 42 are provided and these wheels are journaled on a transversely extending axle 43 which is secured to the braces 26 in any suitable manner. The wheels 42 are positioned adjacent the fulcrum foot 24 and located so that their lowest peripheral portion is positioned slightly above the lower terminal of the fulcrum foot, so that when the rear ends of the lever bars are elevated beyond a predetermined position, the wheels 42 disengage the floor and the forward end of the lifting device is supported by the fulcrum foot 24, thereby relieving the wheels and axle of the stress during the lifting of the automobile.

In use, the forward lifting device is positioned at any convenient place upon the garage floor, and the automobile is then driven forward so that its front wheels straddle the side members 10 and the front axle F engages the inclined tracks 17. Continued forward movement of the automobile causes the front axle F to slide along the tracks 17 and lifts the front wheels from engagement with the car. The tracks 17 are disposed at only a slight angle with relation to the floor, to enable the friction set up between the axle F and the tracks 17 to overcome the tendency of the automobile to gravitate rearwardly along the tracks 17, and thus hold the car in the desired position upon the tracks. The stops 19 prevent the automobile from being driven forwardly from engagement with the tracks 17, and if the distance is not properly gaged by the driver, the continued forward movement of the car will cause the front axle F to engage the stops 19 and move the entire forward lifting device forward, thus maintaining the front axle F in the desired position upon the tracks 17.

After the forward wheels are elevated, the rear lifting device is gripped at its rear end and held so that the lever bars 21 maintain approximately a horizontal position, in which position the wheels 42 engage the floor and the fulcrum foot 24 is spaced from the floor so that the entire rear lifting device may be freely moved along the floor. Now the rear lifting device is moved forwardly under the rear axle R until the overhanging portions 34 of the rest blocks pass over the truss rod T and under the rear axle F, and the shoulders 33 engage the truss rod R. In this position the device may be released, and it will remain supported by the truss rod T, as shown in Figure 3, so that both hands of the operator are free to conveniently position the jack J. This jack is placed under the jack rest 28 with its upper terminal or lifting head in engagement with the wear plate 31, and as the jack J is manipulated to cause its lifting head to move upwardly, the rear end of this lifting device is moved upwardly until the wheels 42 disengage the floor and allow the fulcrum foot 24 to rest on the floor to support the forward end of the device. Further manipulation of the jack J causes the wear plates 36 of the rest blocks 32 to engage the axle R, and the plates 37 to engage the usual truss rod T and finally lift the rear wheels of the automobile from engagement with the floor.

In this position, the car is rigidly supported in an elevated position, with all four tires relieved of the stress caused by the weight of the car resting upon the tires. This arrangement prolongs the life of the tire, and also permits the tire to be repaired or exchanged at will, as well as allowing the brakes to be tested and the entire operating instrumentalities of the automobile to freely function in order to work lubricant into the moving components and to detect any suspected defects.

When it is desired to remove the car from the garage, the jack J is manipulated to lower the rear end of the rear lifting device until the rear wheels of the automobile engage the floor. and the overhanging portions 34 of the rest blocks 32 are disengaged from the truss rod T so that the device may rest upon the floor. The automobile is then backed in the usual manner, which causes the front axle F to slide rearwardly and finally disengage the tracks 17 thus releasing the car.

If the lifting device is employed in connection with automobiles having no truss rod on their rear axle, then the wear plates 36 of the rest blocks 32 are moved directly into engagement with the rear axle and the device used as hereinbefore elucidated.

Having thus described my invention, what is claimed as new is:—

1. An automatic lifter including spaced side members having inclined tracks positioned to engage and guide the front axle of the automobile to elevated position as the said automobile is propelled forwardly by its rear wheels, stop members carried by the side members and positioned to limit the forward sliding movement of the front axle along the said tracks, cross strips secured to the opposed terminals of the side members to secure the said members in fixed relation to each other, diagonally disposed brace bars secured to the side members, and means under control of an operator for elevating the rear axle of the automobile after the front axle has been elevated.

2. An automobile lifter including spaced side members having inclined upper edges, metallic tracks secured to the inclined edges of the side members by inwardly bending the opposed ends of the metallic tracks and letting these ends into the side members, said tracks being positioned to guide the front axle of the automobile to elevated position as the said automobile is propelled forwardly by its rear wheels, and means under control of an operator for elevating the rear axle of the automobile.

3. An automobile lifter including a composite lever comprising spaced lever bars disposed to engage the automobile at opposed sides of the center of the axle, a fulcrum foot uniting the spaced bars at one terminal of the composite lever and positioned to engage the ground, and a jack rest uniting the opposed terminals of the spaced lever bar and provided with a jack-receiving surface intermediate its ends to insure the central positioning of the jack relative to the device to thereby maintain the equilibrium of the device during its elevation by the conventional jack.

4. An automobile lifter including a composite lever comprising spaced lever bars disposed to engage the automobile axle at opposed sides of the center of the axle, a fulcrum foot uniting the spaced lever bars at one terminal of the composite lever and positioned to engage the ground, and a jack rest uniting the opposed terminals of the said bars and provided with a jack-receiving recess intermediate its end to insure the central positioning of the jack relative to the device to thereby maintain the equilibrium of the device during its elevation by the conventional jack.

5. An automobile lifter including a composite lever comprising spaced obliquely disposed lever bars arranged to engage the automobile at opposed sides of the center of its axle, a relatively long fulcrum foot uniting the lever bars at one terminal of the composite lever and positioned to engage the ground, a relatively short jack rest uniting the opposed ends of the lever bars and provided with a jack receiving surface intermediate its ends to insure the central positioning of the jack relative to the device.

6. An automobile lifter including a lever bar, a fulcrum foot carried at one end of the lever bar, a jack rest carried at the opposed end of the lever bar, a rest block carried intermediate the ends of the lever bar and positioned to engage the axle of the automobile, said rest block overhanging the lever bar to provide a recess for the reception of the usual axle truss rod.

7. An automobile lifter including a lever bar, a fulcrum foot carried at one end of the lever bar, a jack rest carried at the opposed end of the lever bar, a rest block carried intermediate the ends of the lever bar and positioned to engage the axle of the automobile, said rest block overhanging the lever bar to provide a recess for the reception of the automobile axle truss rod, a shoulder formed at one end of the said recess to engage the truss rod when the rest block is positioned beneath the automobile axle.

8. An automobile lifter including a lever bar, a fulcrum foot carried at one end of the lever bar, a jack rest carried at the opposed end of the lever bar, and a wheel journaled to the lever bar and positioned to support the lever bar when the lever bar is in a lowered position and to disengage the ground as that end of the lever bar which carries the jack rest is elevated to permit the fulcrum foot to engage the ground.

In testimony that I claim the foregoing as my own, I have hereto affixed my signature.

LOUISE JORDAN LIDDELL.